United States Patent [19]

Brothers et al.

[11] 4,159,739
[45] Jul. 3, 1979

[54] HEAT TRANSFER SURFACE AND METHOD OF MANUFACTURE

[75] Inventors: Warren S. Brothers, Skaneateles; Albert J. Kallfelz, Camillus, both of N.Y.

[73] Assignee: Carrier Corporation, Syracuse, N.Y.

[21] Appl. No.: 815,116

[22] Filed: Jul. 13, 1977

[51] Int. Cl.² ................... F28F 1/36; F28F 13/02
[52] U.S. Cl. .................... 165/133; 62/527; 165/184
[58] Field of Search .............. 165/133, 181, 184; 62/527

[56] References Cited

U.S. PATENT DOCUMENTS

| 3,299,949 | 1/1967 | Beurtheret | 165/133 |
| 3,326,283 | 1/1967 | Ware | 165/181 |
| 3,454,081 | 7/1969 | Kun et al. | 165/133 |
| 3,487,670 | 1/1970 | Ware | 165/133 |
| 3,496,752 | 2/1970 | Kun et al. | 165/133 |
| 3,566,514 | 3/1971 | Szumigala | 165/133 |
| 3,696,861 | 10/1972 | Webb | 165/133 |
| 3,768,290 | 10/1973 | Zatell | 165/133 |
| 4,050,507 | 9/1977 | Chu et al. | 165/133 |

OTHER PUBLICATIONS

Heat Transfer in Evaporation, Jacob, vol. I, pp. 620–641.

Primary Examiner—Sheldon Jay Richter
Attorney, Agent, or Firm—J. Raymond Curtin; Robert P. Hayter

[57] ABSTRACT

A heat transfer surface for nucleate boiling of liquids is formed on the outer surface of a heat exchanger tube. Helical ridges having two fins each encase the tube. A fin at each ridge is angled toward the adjacent fin on the adjacent ridge forming a gapped cavity therebetween. The method of making the tube includes rolling alternating deep grooves and shallow grooves in the outside surface of the tube and then flaring the fins to form the gapped cavity.

8 Claims, 5 Drawing Figures he heat transfer surface to form grooves of microscopic density and then forming cavities by deforming the material between the grooves into the grooves. In Webb, U.S. Pat. No. 3,696,861, fins on a heat exchange tube are unidirectionally rolled over toward the adjacent fin to form vapor entrapment sites therebetween.

HEAT TRANSFER SURFACE AND METHOD OF MANUFACTURE

BACKGROUND OF THE INVENTION

1. Field of the Invention

This invention relates to heat exchanger apparatus for use with a boiling liquid. More particularly this invention relates to a heat exchanger tube having a fluid to be cooled passing therethrough and a boiling refrigerant in contact with the external surface of the tube. The invention also relates to the method of manufacturing a tube of this particular configuration.

2. Prior Art

In certain refrigeration applications such as a chiller or an evaporator liquid to be cooled is passed through a tube while liquid refrigerant is in contact with the outside of the tube. Usually the tube is either immersed in refrigerant or wetted with a refrigerant spray. The refrigerant changes state from a liquid to a vapor absorbing heat from the fluid to be cooled within the tube. The selection of the external configuration of the tube is extremely influential in determining the boiling characteristics and overall heat transfer rate of the tube.

It has been found that the transfer of heat to a boiling liquid is enhanced by the creation of nucleate boiling sites. It has been theorized that the provision of vapor entrapment cavities in the heat exchanger surface creates sites for nucleate boiling.

In nucleate boiling the trapped vapor is superheated by the heat exchanger surface and consequently grows in size until surface tension is overcome and the vapor bubble breaks free from the surface. As the bubble leaves the surface, liquid wets the now vacated area and the remaining vapor has a source of additional liquid for creating vapor to form the next bubble. The continual wetting and release together with the convection effect of the superheated bubble traveling through and mixing the liquid result in an improved heat transfer rate for the heat exchanger surface.

It is known that the surface heat transfer rate is high in the area where the vapor bubble is formed. Consequently, the overall heat transfer rate tends to increase with the density of vapor entrapment sites per unit area of heat exchanger surface. See for example, U.S. Pat. No. 3,696,861 issued to Webb and entitled "Heat Transfer Surface Having A High Boiling Heat Transfer Coefficient", or Heat Transfer by M. Jakob, Vol. 1, published by John Wiley and Sons.

There are numerous heat transfer surfaces which utilize nucleate sites to enhance overall heat transfer rates. In U.S. Pat. No. 3,454,081 granted to Kun and Czikk entitled "Surface For Boiling Liquids", a cross-grooved boiling surface layer is created having sub-surface cavities with restricted openings to the outer surface of monoscopic density. In U.S. Pat. No. 3,326,283 issued to Ware and entitled "Heat Transfer Surface", fins on tube are deformed to form indentations for the promotion of nucleate boiling.

There are also many methods of creating nucleate boiling surfaces. In U.S. Pat. No. 3,487,670 entitled, "Method of Forming Indentations In Fins Extending From A Heat Transfer Surface", a method is disclosed of forming the heat transfer surface in the Ware patent above. The fins are rolled with an indenting tool which flares the fin material beyond each side wall of the fin to form the vapor entrapment cavity. In U.S. Pat. No. 3,496,752 granted to Kun the method includes scoring the heat transfer surface to form grooves of microscopic density and then forming cavities by deforming the material between the grooves into the grooves. In Webb, U.S. Pat. No. 3,696,861, fins on a heat exchange tube are unidirectionally rolled over toward the adjacent fin to form vapor entrapment sites therebetween.

The creation of a cost effective high performance (nucleate boiling) heat exchanger tube that can be manufactured from a commercial tube blank in a single pass on a conventional tube finning machine is the problem resolved herein. In order for the tube to be cost effective, the additional expense in manufacturing the high performance tube must be recovered either in the decreased expense of construction utilizing the higher performance tube or in increased overall capacity of the heat exchanger.

SUMMARY OF THE INVENTION

An object of the invention is to form a highly effective heat transfer surface.

Another object of the invention is to sustain nucleate boiling at a relatively high rate on a heat transfer surface.

Another object of the present invention is to provide a high performance boiling tube which can be used with existing refrigeration equipment.

A still further object of the present invention is to provide an economical and durable heat exchanger tube having increased external surface area over a smooth tube.

Another object of the present invention is to provide a high performance nucleate boiling tube.

A still further object of the present invention is to provide a high performance tube which can be formed by a single rolling operation.

A further object of the present invention is to produce a high performance tube by rolling a conventional tube blank in a tube finning machine.

Other objects will be apparent from the description to follow and from the appended claims.

The preceding objects are achieved according to a preferred embodiment of the invention by the provision of alternating deep grooves and shallow grooves on the surface of a heat exchanger tube. A ridge is defined by adjacent deep grooves, the ridge having a base portion and two fins extending radially outward therefrom. The shallow groove separates the two fins extending from the base portion. The two fins of each ridge are then bent in opposite directions toward the next adjacent fin on either side so that the fin partially encases the deep groove forming a single gapped cavity between adjacent ridges for promoting nucleate boiling.

The present invention is formed in a single pass through a conventional tube finning machine. A series of discs are mounted on a tool arbor in engagement with the tube passing through a tube finning machine. These discs are so arranged that alternating deep grooves and shallow grooves are first formed in the outer surface of the tube. Thereafter a flaring disc is applied to the shallow groove to force the fins outward over the deep grooves forming the gapped cavity between adjacent ridges.

DESCRIPTION OF THE PREFERRED EMBODIMENT

The embodiment of the invention described below is adapted for use in a heat exchanger having a fluid to be cooled passing through a heat exchanger tube and simultaneously having a refrigerant to be vaporized in contact with the external surface of the tube. This heat transfer arrangement of fluid to be cooled and refrigerant can be found in an evaporator or chiller of a refrigeration system. In a typical application a plurality of parallel heat exchanger tubes are mounted such that several tubes form a fluid flow circuit and a plurality of parallel circuits are provided for the fluid to be cooled. Usually all the tubes of the various circuits are contained within a single casing wherein they are immersed in refrigerant.

Figure 1:
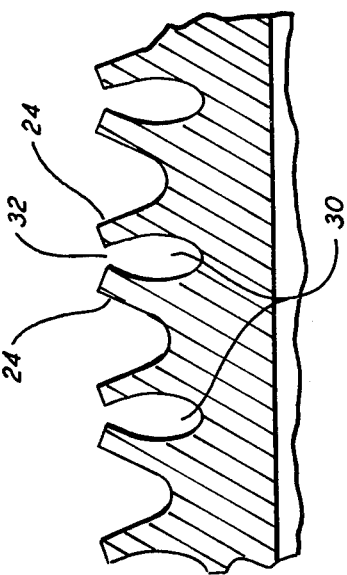
FIG. 1 is a partial sectional view of a smooth surface heat exchanger tube.
Figure 2:
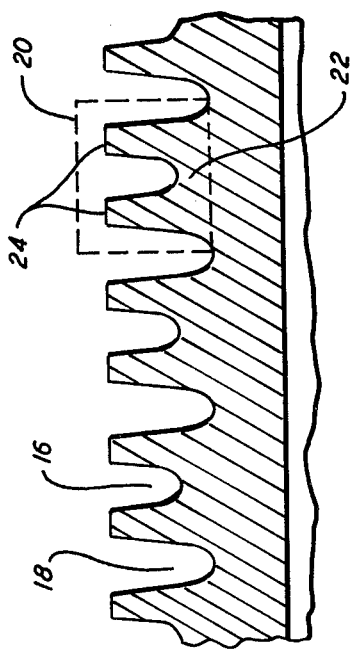
FIG. 2 is a partial sectional view of the same tube as shown in FIG. 1 after having the alternating shallow and deep grooves rolled therein.

Referring now to the drawings, FIG. 1 is a cross-sectional view of one wall of a smooth surface cylindrical tube prior to rolling. FIG. 2 is a cross-sectional view of the same tube after alternating deep grooves 18 and shallow grooves 16 have been rolled therein. As a result of the rolling ridges 20 are formed, each ridge 20 constituting the part of the tube between adjacent deep grooves 18 which extends radially outward from an imaginary line drawn from the lowest point of a deep groove 18 to the lowest point of the adjacent deep groove 18. In FIG. 2 a ridge 20 is denoted as that part of the tube shown within the dotted line.

Ridges 20 each have a base portion 22 and two fins 24. The base portion 22 is that part of ridge 20 that is located radially outward from an imaginary line connecting the lowest point of adjacent deep grooves and radially inward from an imaginary line drawn between the lowest point of adjacent shallow grooves 16. Fins 24 are mounted to base portion 22 one on each side of shallow groove 16 and extend radially outward from the imaginary line connecting the lowest points of adjacent shallow grooves 16.

Figure 3:
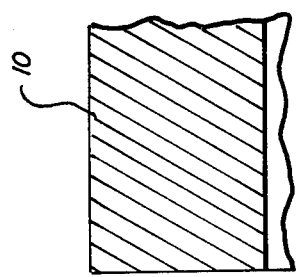
FIG. 3 is a partial sectional view of the same tube as shown in FIGS. 1 and 2 after having the fins flared to form the gapped cavities of the invention.

FIG. 3 is a cross-sectional view of the tube from FIGS. 1 and 2 having fins 24 flared to partially enclose cavities 30. Fins 24 have been angled away from the center of ridge 20 toward the adjacent ridge thereby partially covering deep groove 16. The pair of fins on each ridge are angled in opposite directions forming a narrow gap with the adjacent fin from the adjacent ridge. Gap 32, between the ends of the adjacent fins 24, is of such a dimension as to promote nucleate boiling within cavity 30. Cavity 30 is defined by the bottom of deep groove 18, the sides of adjacent base portions 22 and the sides of adjacent fins 24.

Ridges 20 are normally rolled in helical arrangement around tube 10. Thereby a single gapped cavity 30 is formed extending helically about the entire length of the heat exchanger tube. Of course, if double lead tooling is used two gapped cavities will extend the entire length of the heat exchanger tube. Obviously, more cavities may be provided by either increasing the number of leads in the tooling or by discontinuing the cavities at some location over the length of the tube, as for example to form lands on the tube surface whereby the tube may be held within a conventional tube sheet.

Figure 4:
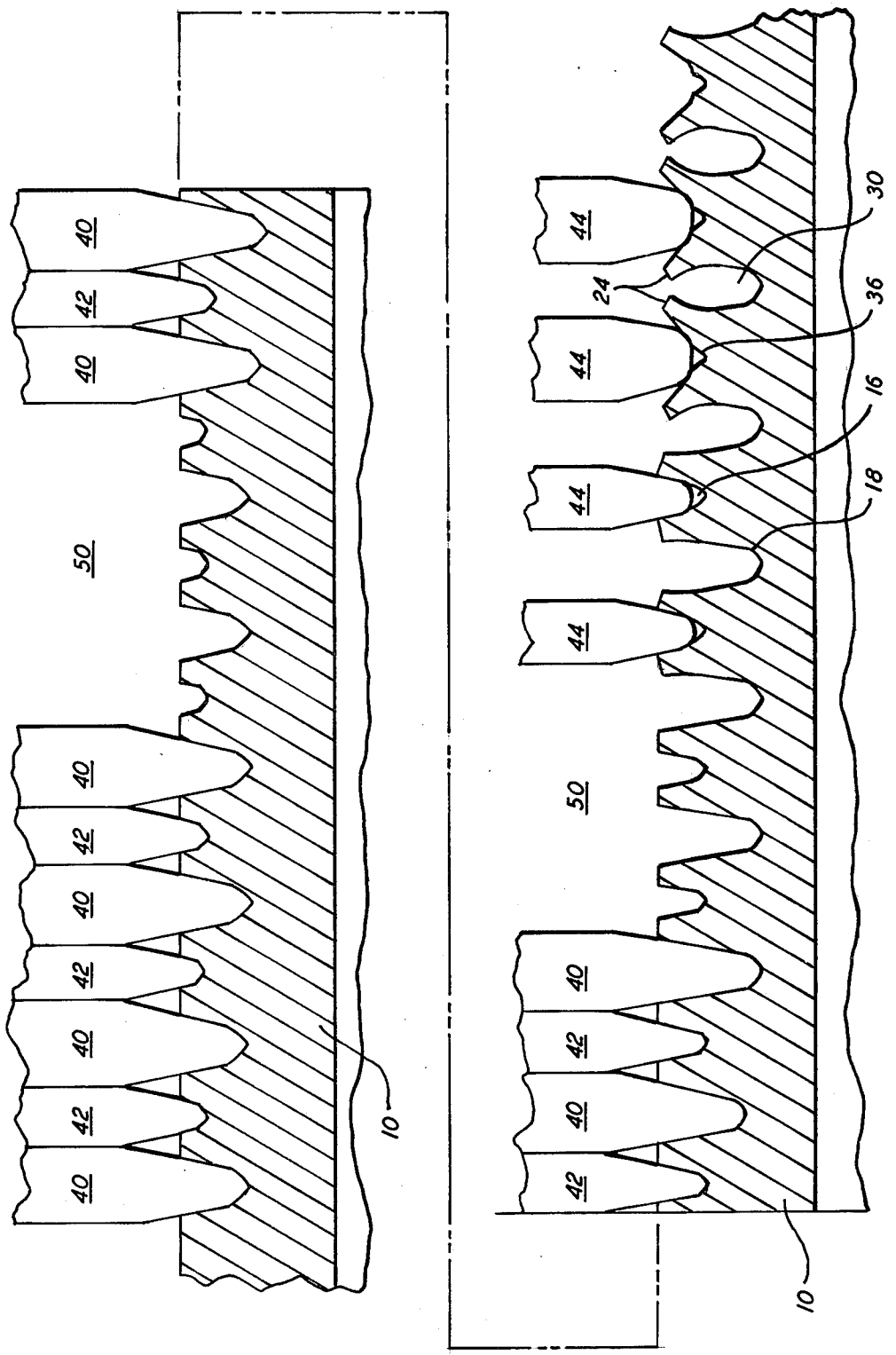
FIG. 4 is a partial sectional view of the heat exchanger tube with the tool gang engaged therewith gang showing the progression of rolling discs and flaring discs utilized to form the shallow and deep grooves and the gapped cavities of the invention.

In FIG. 4 the tool arrangement used within a conventional tube finning machine to roll this high performance tube is shown. In the conventional tube finning machine cylindrical discs are mounted on a multiplicity of tool arbors in such a manner that when rotated the discs displace portions of the tube forming the desired configuration. From FIG. 4 it can be particularly seen that alternating deep grooves and shallow grooves are rolled into the surface of tube 10 by alternating deep groove discs 40 and shallow groove discs 42, said discs progressing in depth as the tube proceeds along tool gang 38. The specific number of rolling discs to achieve a specific width or depth of a particular groove or the number of tool arbors using multiple lead tooling is a design expedient as is the space, if any, between adjacent groups of discs. Also shown in FIG. 4 are a series of four flaring discs 44 for use with double lead tools, said discs being designed to fit within shallow groove 16 formed in ridges 20 on the surface of the tube such that the pair of fins 24 on each ridge are flared outwardly in opposite directions. It can be seen that the four flaring discs, a narrow and a wide disc on each set of double lead tooling, are arranged such that upon rolling the fins are progressively displaced. During flaring the gapped cavity 30 is formed by fins 24 being partially displaced to encase the groove 18 leaving a narrow gap 32 therebetween. It can be further seen in FIG. 4 that flare discontinuities 36 are produced at the bottom of shallow groove 16 when the fins 24 are flared. These flare discontinuities provide additional surface area and irregularities to promote nucleate boiling at sites other than cavities 30.

In a typical heat exchange application a copper tube having a 0.745 inch external diameter and a 0.0515 inch wall thickness would be utilized. After rolling and flaring the wall thickness measured at the bottom of the gapped cavity is approximately 0.028 inches.

Figure 5:
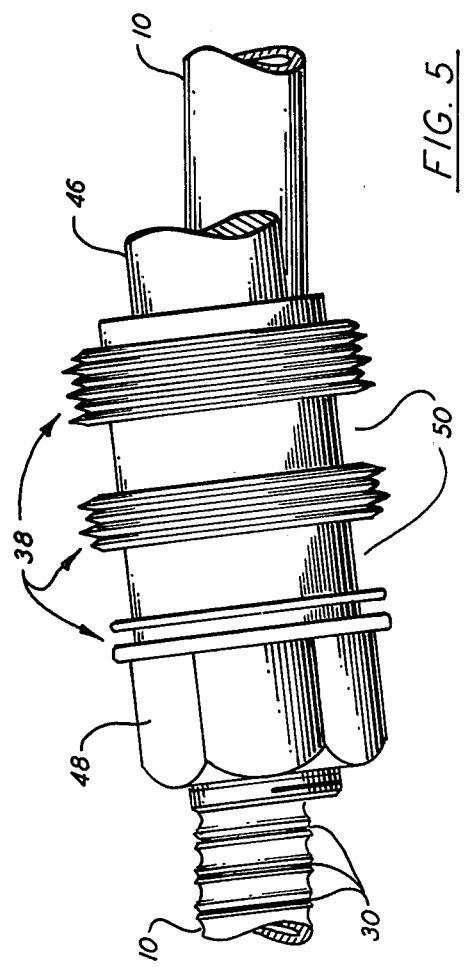
FIG. 5 is a perspective view of a tool arbor having tool gang thereon shown skewed slightly to the tube being rolled.

FIG. 5 shows an arbor 46 mounted so that its axis is skewed slightly to the axis of tube 10. Mounted on arbor 46 is tool gang 38 as shown in FIG. 4 and arbor nut 48 locking tool gang 38 and the appropriate spacers 50 in place on the arbor. As can be seen from FIG. 5 the axis of the tool arbor forms an acute angle approximating 3 degrees with the axis of tube 10. This small amount of skew provides for tube 10 being driven along its axis as arbor 46 and the tool gang 38 thereon are rotated. Consequently the tube 10 is moved through the tube finning machine (not shown) containing the tool gang and arbor as the arbor is rotated.

Within tube 10 is a conventional smooth mandrel (not shown) for supporting the interior surface of the tube during rolling. The mandrel is of sufficient length that the interior surface of the tube is supported beneath all the discs on the tool arbor.

It is further obvious that as the tube proceeds along its axis, first the alternating deep grooves and shallow grooves are rolled progressively deeper into the tube surface and then the fins are flared outwardly to form the gapped cavities, all rolling occurring in a single pass through the tube finning machine. In a typical application a plurality of tool arbors mounted about the circumference of the tube will be simultaneously utilized to provide smooth and consistent rolling.

The invention has been described in detail with particular reference to a preferred embodiment thereof, but it will be understood that variations and modifications can be effected within the spirit and scope of the invention.

We claim:

1. A thermally conductive surface for transferring heat to a boiling liquid in a heat exchange apparatus comprising at least one gapped cavity wherein vapor is trapped to promote nucleate boiling, said cavity being defined by a wall and spaced ridges affixed to the wall, the ridges having a base portion attached to the wall and two fins mounted to the base portion such that a fin from each ridge is angled over the cavity forming a narrow gap therebetween, said cavity being elliptical in configuration and having curvilinear surfaces throughout, such that from the portion of the cavity adjacent the wall portion of the surface the cavity increases in width to a point and thereafter decreases in width to a gap at the end of the cavity formed by the fins, said gap serving to allow limited flow of the heat transfer fluid into and out of the cavity.

2. The invention as set forth in claim 1 wherein the surface is cylindrical in shape, the cavity is helical about the surface and wherein the ridges are an integral part of the thermally conductive surface.

3. The apparatus as set forth in claim 1 wherein the surface is immersed within the boiling liquid on a generally horizontal plane such that vapor trapped within the cavity may be emitted through the gap formed by the fins to travel upwardly through the liquid in a direction generally perpendicular to the plane of the surface.

4. A tube bundle for use as a heat exchanger which comprises:

a plurality of connected tubes immersed in a heat transfer fluid which may be vaporized, said tubes having a relatively warm working fluid flowing therethrough such that heat energy is transferred from the working fluid to the heat transfer fluid;

said tubes being spaced from each other to provide complete circumferential contact with the heat transfer fluid;

at least one of said tubes having a wall portion in contact with the working fluid and helical ridges in contact with the heat transfer fluid, each ridge having a base portion connected to the wall and two fins mounted to the base portion, said fins of each ridge being angled in opposite directions toward but spaced from the closest fin of the next adjacent ridge so that a cavity is formed between adjacent ridges, one fin from each ridge serving to partially enclose the cavity to aid in the entrapment of vapor within the cavity for promoting nucleate boiling of the heat transfer fluid; and said cavity being elliptical in configuration and having curvilinear surfaces throughout, such that from the portion of the cavity adjacent the wall portion of the tube the cavity increases in width to a point and thereafter decreases in width to a gap at the end of the cavity formed by the fins, said gap serving to allow limited flow of the heat transfer fluid into and out of the cavity.

5. The invention as set forth in 4 wherein the base portion of the ridge extends radially outward from the wall and wherein the fins of the ridge are angled therefrom.

6. The invention as set forth in claim 5 wherein the wall is a cylindrical tube and wherein the ridges are an integral part of the tube formed in a helical configuration about the tube.

7. The invention as set forth in claim 6 wherein one or more helical cavities is formed extending the length of the tube between adjacent ridges.

8. The apparatus as set forth in claim 4 wherein the tube bundle is immersed within the heat transfer fluid on a generally horizontal plane such that heat transfer fluid vaporized within the cavity during heat transfer operations may bubble upwardly through the liquid heat transfer fluid out of the gapped cavity in a direction generally perpendicular to the plane of the tube bundle.

* * * * *